United States Patent [19]

Collett et al.

[11] Patent Number: 5,711,013

[45] Date of Patent: *Jan. 20, 1998

[54] CONFORMANT COMPACT PORTABLE CELLULAR PHONE CASE SYSTEM AND CONNECTOR

[75] Inventors: Gordon C. Collett, Yamhill; Donald T. Rose, Beaverton, both of Oreg.

[73] Assignee: Cycomm Corporation, Lake Oswego, Oreg.

[*] Notice: The term of this patent shall not extend beyond the expiration date of Pat. No. 5,517,683.

[21] Appl. No.: 582,336

[22] Filed: Jan. 18, 1996

Related U.S. Application Data

[63] Continuation of Ser. No. 374,926, Jan. 18, 1995, Pat. No. 5,517,683.

[51] Int. Cl.$^6$ .................. H04B 1/40; H04Q 7/32
[52] U.S. Cl. .................. 455/558; 455/575; 455/90; 455/349; 455/351
[58] Field of Search .................. 455/89, 90, 128, 455/33.1, 344, 345–351, 557, 558, 575; 379/58, 441, 446–450, 454, 455

[56] References Cited

U.S. PATENT DOCUMENTS 5,136,229  8/1992  Galvin .................................. 455/89
5,287,554  2/1994  Furuno .................................. 455/89
5,335,276  8/1994  Thompson et al. .................... 455/89
5,490,202  2/1996  Maekawa ............................ 455/90 X

FOREIGN PATENT DOCUMENTS 2-274017  11/1990  Japan .................................. 455/89
5-136722  6/1993  Japan .................................. 455/127

Primary Examiner—Chi H. Pham
Attorney, Agent, or Firm—Fliesler, Dubb, Meyer & Lovejoy LLP

[57] ABSTRACT

A compact portable cellular telephone extension that provides additional electronic functions is implemented in a case attachable to a first external surface of the cellular phone to form a physically integral unit. A connector is supported by the case and couples the extension electronics to the cellular phone electronics. The connector connects through a second external surface of the cellular phone that lies in a plane different from the plane of the first external surface. A speaker arm extends from the case and supports a speaker unit. The speaker arm is positionable in a first position adjacent a third external surface of the cellular phone and in a second position away from the third external surface allowing the case to be readily attached and detached.

21 Claims, 10 Drawing Sheets

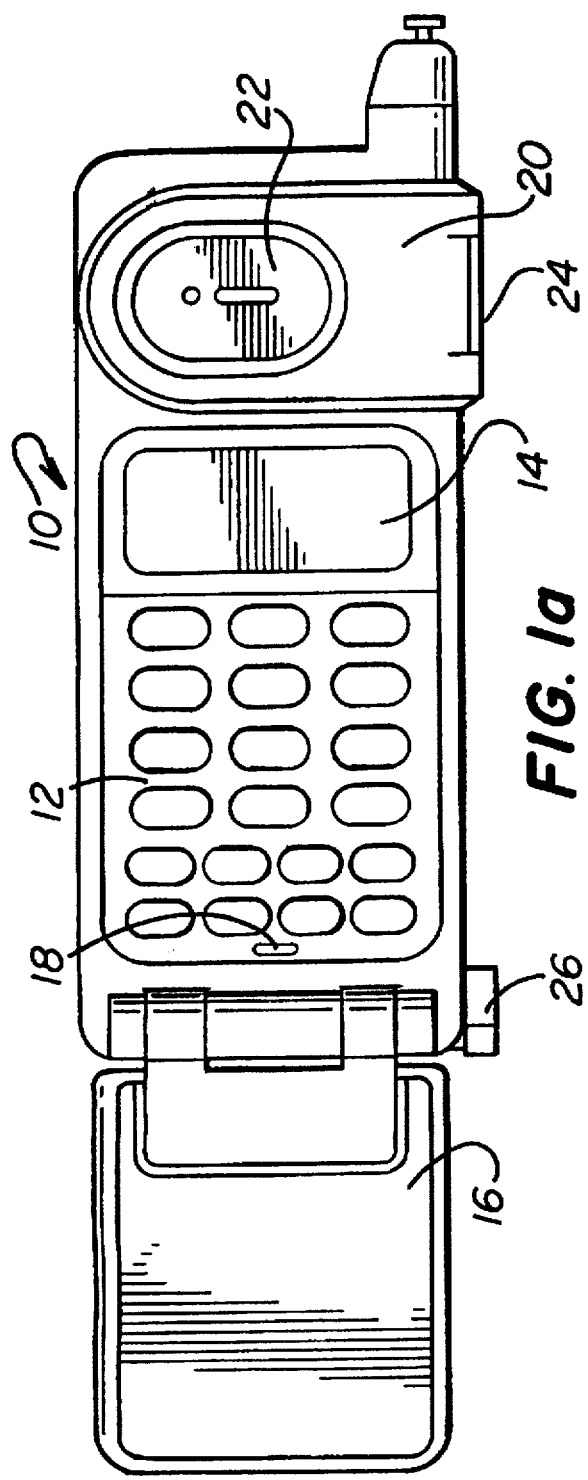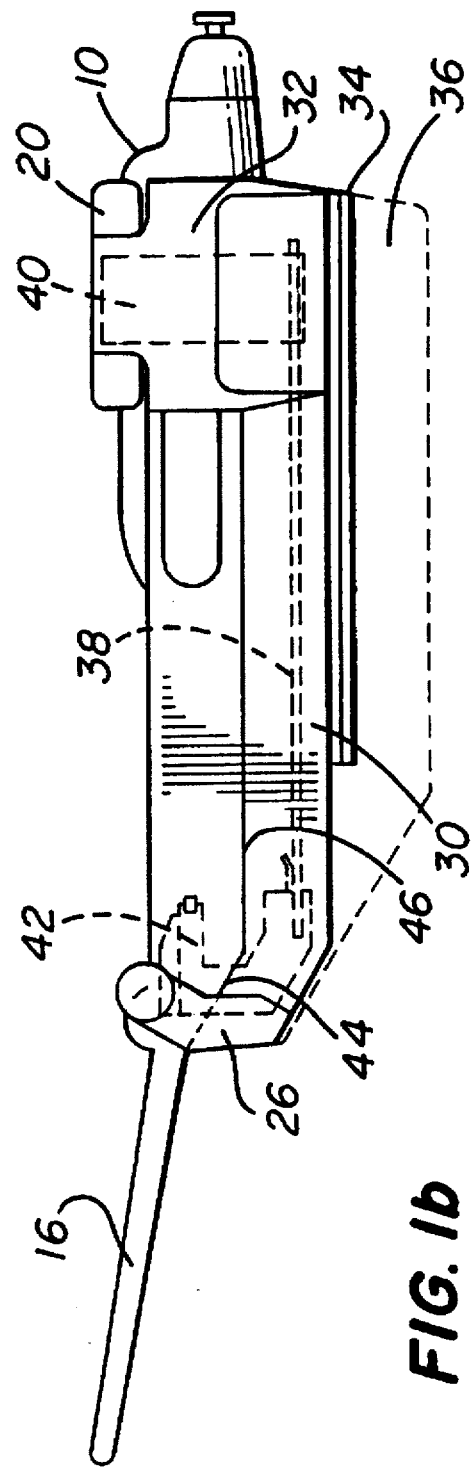
FIG. 1a
FIG. 1b

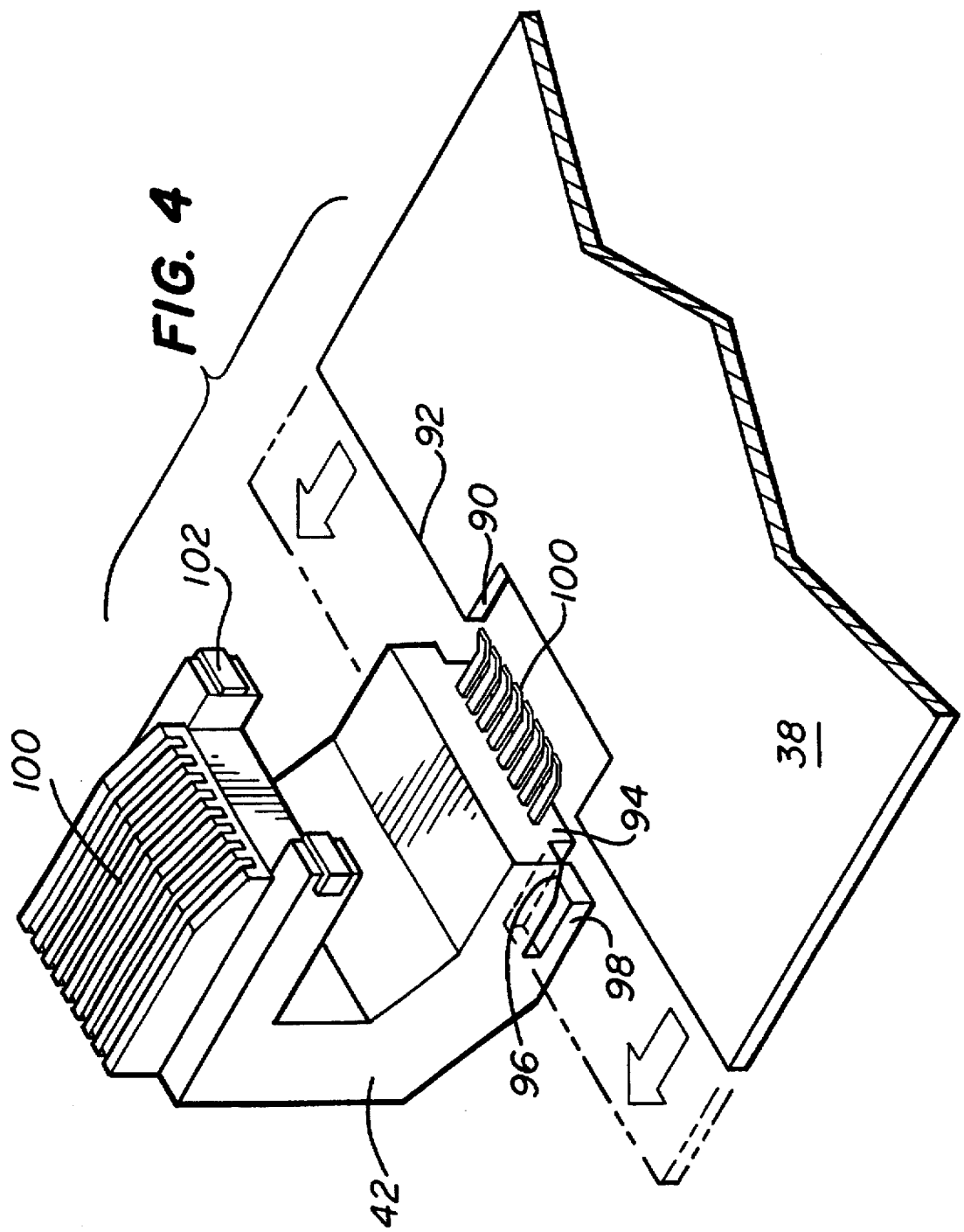

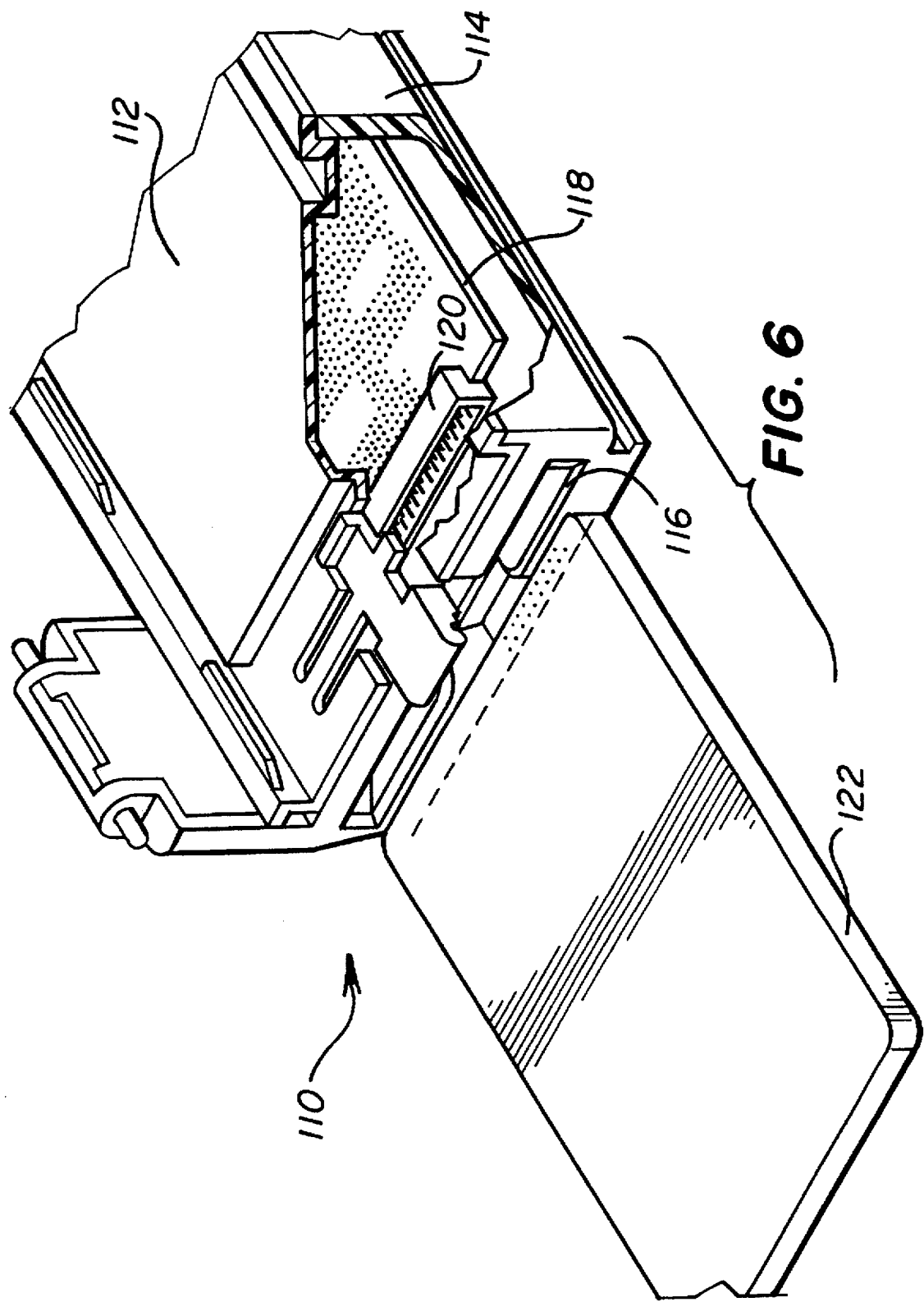

CONFORMANT COMPACT PORTABLE CELLULAR PHONE CASE SYSTEM AND CONNECTOR

This application is a continuation of Ser. No. 08/374,926, filed Jan. 18, 1995 now U.S. Pat. No. 5,517,683.

BACKGROUND OF THE INVENTION

1. Field of the Invention

The present invention is generally related to portable cellular telephone systems and, in particular, to a case system, conformant to a compact and complexly shaped portable cellular telephone system, that includes a microprocessor system providing supplementary control and signal processing functions.

2. Description of the Related Art

There exists a class of cellular telephones known as compact portable cellular phones. This class is generally characterized by a collapsible or foldable case structure that permits carrying of the cellular phone in a shirt or coat pocket or small purse. A particular attractiveness of such phones is specifically the small size of the phone.

One such exemplary compact portable cellular phone is the Motorola Micro-TAC series of phones. The Micro-TAC phones employ a flip down sound deflector structure to expose the numeric key pad and a numeric display. A rechargeable battery is rail mountable to the back surface of the phone. Planar slide contacts that mate on the adjacent surfaces between the battery and cellular phone provide operational power.

While the small size and portability of the Micro-TAC phone are primary advantages, products exist to permit the utilization of the Micro-TAC in more conventional settings. Specifically, a fixed mounting structure is known that permits the Micro-TAC to be temporarily mounted in a fixed position in, for example, an automobile. An access connector receptacle is provided at an external surface of the Micro-TAC separate from the battery attachment surface to permit access to the internal cellular phone electronics. Once the Micro-TAC is placed in the fixed mounting unit, a conventional flexible connector is manually attached to the Micro-TAC phone by way of the connector receptacle. The connector allows for a conventional external antenna, microphone and amplified speaker to be attached to the Micro-TAC. The conventional connector utilized for insertion into the receptacle disables the conduction of power from any attached battery and, further, disables the internal microphone and speaker sub-systems of the Micro-TAC phone. Disconnection of the external connector and removal from the fixed mounting unit re-enables these functions of the Micro-TAC and thereby permits portable use of the Micro-TAC phone.

Another product known to be used with Micro-TAC type cellular phones is mobile battery eliminator and recharging unit. Normally, the rechargeable battery must be recharged in an AC adapter with the battery either separate from or normally mounted to the cellular telephone unit. The battery eliminator connects to the Micro-TAC cellular phone to couple automotive 12 volt DC power to the phone. The battery eliminator may also permit mounting of a rechargeable battery to the eliminator product at the same time permitting the battery to be simultaneously recharged without interruption in the use of the cellular phone.

Electronics adapter units, providing additional electronic functionality, are also known in relationship to mobile and transportable cellular telephones. An exemplary adapter unit is a Hand-held Privacy Unit (HPU-100) that provides proprietary voice encoding for cellular transmissions. The adapter unit attaches to a substantially planar rear surface of the cellular phone. The original manufacturer of the cellular phone provides both large pad power connectors as well as large pad electronics access points for tapping analog voice information from the cellular telephone internal circuitry. The large pad contacts are intended to enable simple contact between the cellular telephone and adapter unit while at the same time presenting only very loose tolerance requirements in the mating of the contacts. Although the rechargeable battery may be further mounted to the attachment unit, a separate microphone and independently powered speaker amplifier system must be provided in order to enable use of the system. Consequently, the resulting system does not provide a single unitary cellular telephone system providing for the provision of additional electronic functions.

Other specialty cellular phones are known to include specialized functions as an integral feature of the cellular phone. For example, a cellular phone is known to incorporate a dedicated and highly-specialized data modem as part of the electronic circuitry of the cellular phone to permit signalling and sign-on communication links with the main cellular switch. Such phones may be connected to, for example, a personal computer to enable cellular digital data communication. However, in such instances, the internal modem is essentially unaccessible and a separate modem is required.

SUMMARY OF THE INVENTION

Thus, a general purpose of the present invention is to provide an electronics extension system for a portable compact cellular telephone system.

This is achieved by the present invention by the provision of an extension system that implements the additional electronic functions in a case attachable to a first external surface of the cellular phone to form a physically integral unit. A connector is supported by the case and couples the extension electronics to the cellular phone electronics. The connector connects through a second external surface of the cellular phone that lies in a plane different from the plane of the first external surface. A speaker arm extends from the case and supports a speaker unit. The speaker arm is positionable in a first position adjacent a third external surface of the cellular phone and in a second position away from the third external surface allowing the case to be readily attached and detached.

Thus, an advantage of the present invention is that the resultant device is a single, compact, physically integral and portable system.

Another advantage of the present invention is that the electronics case is both readily detachable yet at the same time highly conformant to the external geometry of the compact portable cellular phone.

A further advantage of the present invention is that the connector subsystem provides for reliable, enclosed insertion of the connector on simple rail mounting of the case to the compact portable cellular phone.

Yet another advantage of the present invention is that the case provides floating support for the connector subsystem that effectively isolates mating stresses from the internal electronics supporting printed circuit board and intercoupling connector contacts in a compact system.

A still further advantage of the present invention is the provision for integral attachment of additional electronics provided by way of PCMCIA type cards.

Yet still another advantage of the present invention is that it provides the ability to add significant capabilities to an existing basic cellular phone, including a compressed video interface, electronic security features, other electronic broadcast services such as paging and global positioning, and the like.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein:

FIG. 1a provides a top view of a compact portable cellular telephone with the electronics case of the present invention attached;

FIG. 1b provides a side view of a preferred compact portable cellular telephone with the electronics case of the present invention and rechargeable battery shown joined as an integral physical unit;

FIG. 4 provides a detailed view of the connector sub-system, specifically the printed circuit board mounting features thereof;

FIG. 6 provides a partial perspective view illustrating an alternate embodiment providing for the insertion connection and support of a PCMCIA type card;

DETAILED DESCRIPTION OF THE INVENTION

Figure 2:
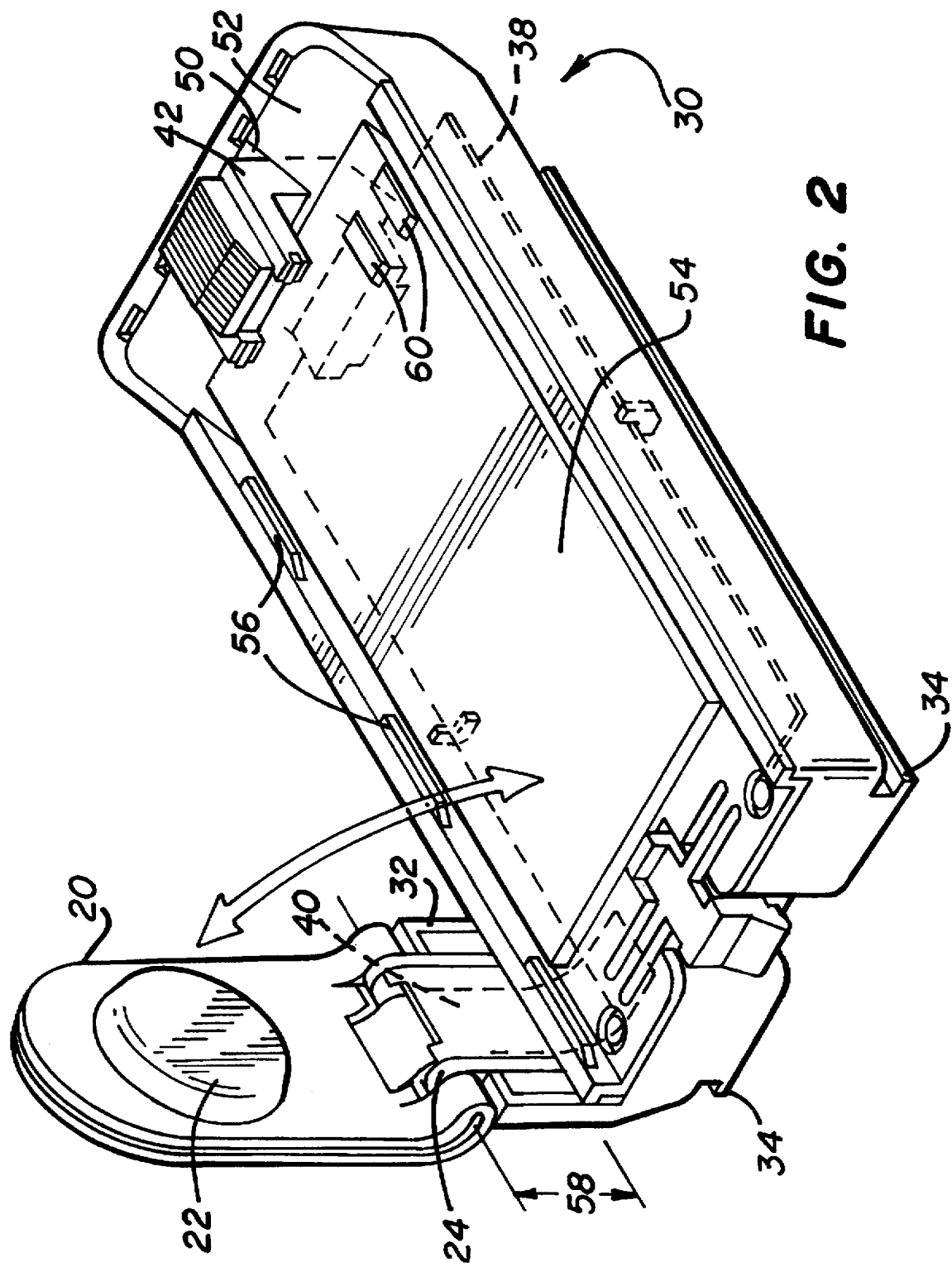
FIG. 2 is a perspective view of the electronics case of the present invention illustrating the positioning of the speaker arm in the non-conformant position.

In FIG. 1a, a Micro-TAC™ type cellular telephone 10 is shown with the electronics case representing the preferred embodiment of the present invention. The cellular telephone 10 includes a numeric keypad 12 and display panel 14. A flip section 16 of the cellular telephone 10 provides a swing-down extension that acts as a sound reflector. A conventional microphone 18 is located typically in the main case of the telephone 10. The conventional speaker of the cellular telephone 10 is hidden behind a swing arm section 20 of the electronics case. The swing arm provides for the mounting of an auxiliary speaker 22 at one end of the arm 20. The other end of the arm 20 is coupled through a hinge section 24 to the electronics case of the present invention. An auxiliary microphone 26 is also provided as an extended attachment to the electronics case of the present invention. The microphone extension allows for positioning of the microphone to acoustically participate with the sound reflected by the flip section 16 of the cellular telephone 10. However, mechanical operation of the flip section 16 is not blocked.

Referring now to FIG. 1b, a side view of the cellular telephone 10 and attached electronics case 30 is shown. The case 30 includes an arm extension 32 that connects to the swing arm 20 for positioning the speaker 22 over the face of the cellular phone 10. The electronics case 32 includes mounting rails 34 that permit the attachment of a replaceable, rechargeable battery 36 to the electronics case 30 to form a single, integral, portable compact cellular telephone system. The relative positioning of the microphone 25, proximate to the hinge of the telephone 10 and generally within the height dimension of the flip section when closed, is also shown.

As shown in outline in FIG. 1b, the electronics case 30 provides for the housing of a printed circuit board 30 having a flexible interconnection to the auxiliary speaker 22 by way of a flex circuit 40. Also attached to the printed circuit board 38 is an insertion type connector 42 that inserts into a connector receptacle in the cellular phone 10 at a normally exposed surface 44. That is, the mounting profile of the battery 36 is such that the surface 46 is normally covered by the battery 36 and the surface 44 is left entirely exposed. As can be seen, a portion of the electronics case 30 of the present invention extends beyond the surface 46 to cover the surface 44 and allow an effectively enclosed connection between the electronics of the case 30 and cellular telephone 10 by way of the connector 42.

The electronics case of the present invention is shown separately in FIG. 2. As shown, the connector 42 extends through an opening 50 through an end section 52 of an inside cover 54 of the case 30. The end section 52 preferably covers the normally external surface 44 of the cellular phone 10 in order to maintain a completely integral appearance of the case 30 when mounted to the phone 10. The interior cover 54 is displaced relative to the edges of the case 30 to permit mounting rails 56 to be provided for attachment of the case 30 to the phone 10. These rails 56 are provided in essential duplication of the rails present on the replaceable battery 36 so that the case 30 is rail mountable to the phone 10 in substantially the same manner. However, to accommodate the not necessarily regular external shape of the phone 10, the swing arm 20 is hinged utilizing the hinge section 24 to allow the arm 20 to be positioned outwardly to allow ready attachment of the case to the cellular phone 10 independent of any irregularities in the side and top external surfaces of the phone 10. The arm 20 may also be positioned downward against the top surface of the phone 10, preferably by application of a spring load, once attachment of the case to the phone is completed. Consequently, the arm 20 may be positioned in a highly conformant position adjacent the top surface of the phone 20 so as to minimize the size of the combined unit as well as to create a single integrally complete packaging system.

The flex circuit 40 is provided to allow the swing arm 20 to be readily repositioned. However, owing to the existence of different models of the cellular telephone 10 having different body thicknesses, the hinge section 24 is permitted to be repositionable in a vertical direction relative to the support arm 32. By adjustment of the vertical distance 58, conformant positioning of the swing arm 20 against the top surface of the phone 10 may be obtained. In one embodiment of the present invention, the flexibility of the flex circuit 40 is utilized to allow the ready repositioning of the hinge section 24 relative to the arm support 32. In this embodiment, an adjustable friction connection or spring tensioning system may be utilized between the hinge section 24 and arm 32 to permit this adjustment. Preferably though, the hinge unit 24 may be ultrasonically bonded to the arm 32 at any one of a number of predetermined heights 58. While this latter embodiment has less adjustability, in that each predetermined position will correspond to essentially only a single model or body thickness of the phone 10, all models of the phone 10 may be accommodated utilizing only a single manufacturing set of case components.

Finally, power slide contacts 60 are provided at a predetermined location on the surface of cover 54 so as to mate with corresponding slide contacts present on the exposed surface 46 of the phone 10. The contacts 60 are positioned identically with the positioning of corresponding contacts present on the battery 36 to provide power to the phone 10. Additional power contacts are provided on the opposing cover of the case 30 so as to mate with the power contacts of the battery 36 when attached to the case 30. Essentially, these contacts provide for a power transfer through the case 30 while providing for power take-off to the electronic components provided on the printed circuit board 38.

Figure 3:
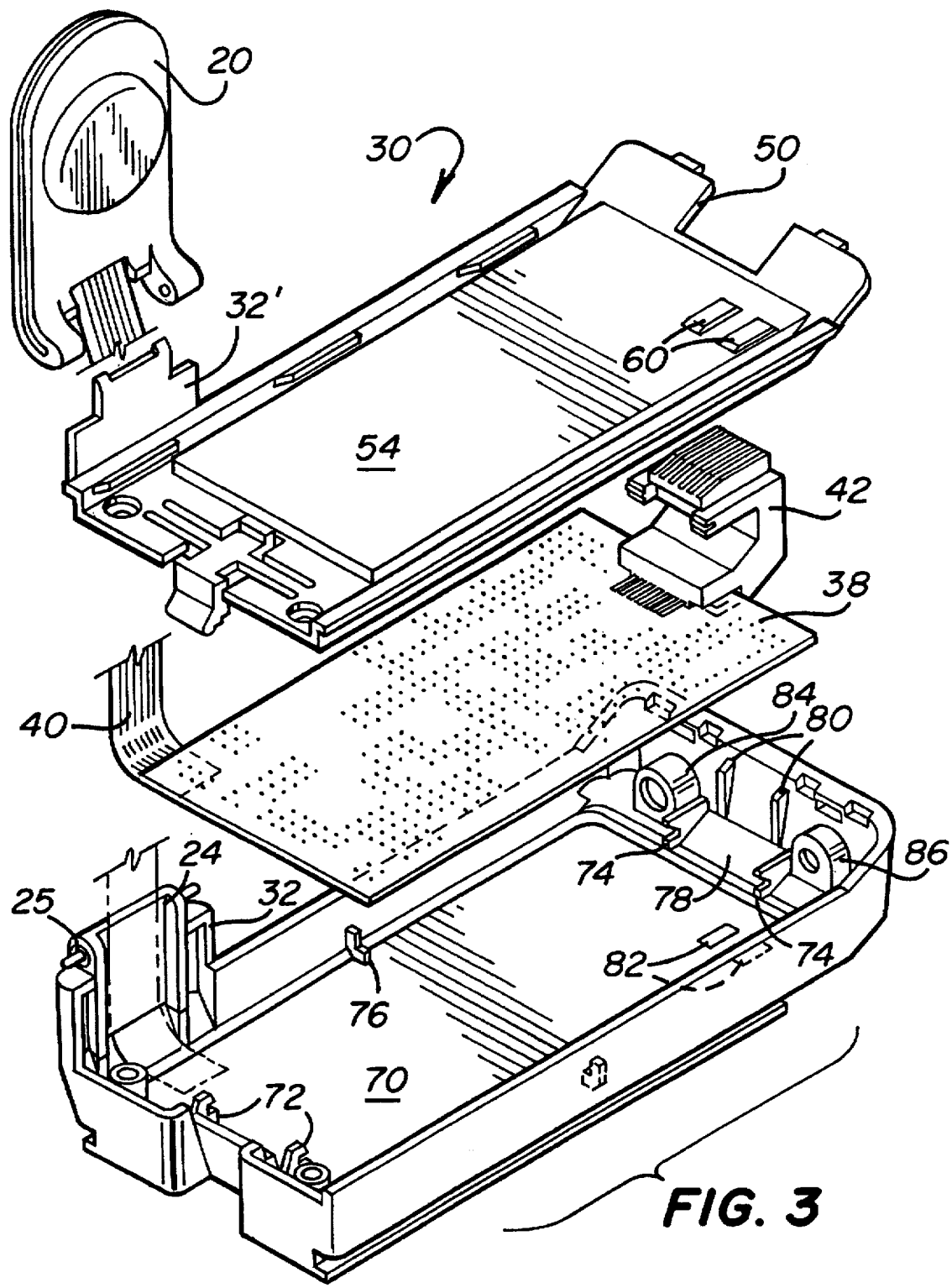
FIG. 3 is an exploded perspective view detailing the assemblage of the printed circuit board within the electronics case of the present invention, the support of the connector sub-system and preferred joint for the flexible arm.

FIG. 3 provides an exploded view of the case 30, including the top cover 54, printed circuit board 38 and base 70. Shown in relationship to the top cover 54 is an interior arm cover 32' that provides a mechanical shield for the vertical arm section 32 and adjustable hinge section 24. The arm cover 32' is formed as an extension of the inside cover 54. The arm cover 32' may also be separately formed and ultrasonically welded or snap connected to the vertical arm section 32, thereby allowing continued vertical adjustability of the hinge section 24.

The flex circuit 40 and connector 42 are both connected to respective portions of the printed circuit board 38. The flex circuit 40 may be soldered directly to lead points on the printed circuit board 38 or coupled through a conventional flex circuit connector to the electronic circuitry present on the printed circuit board 38. Similarly, the connector 42 provides metallic leads that may be soldered directly to solder lead points present on the printed circuit board 38. Since the shape and construction of the connector 42 is non-standard, conventional inter-coupling connectors are not available to permit a flexible or stress-relieved interconnection of the connector 42 to the printed circuit board 38. Furthermore such an additional connector would provide an additional cost to the component and manufacturing expense of the case 30. Therefore, the connector 42 is preferably solder connected directly to the printed circuit board 38.

The printed circuit board 38 itself is preferably mounted into a case bottom cover 70 at the connection supports 72 and 74. One or more printed circuit boards may be stack mounted on top of the board 38. As shown, the connection supports 74 permit edge insertion of the printed circuit board 38 while the connection supports 72 permits snap down capture of a corresponding edge of the printed circuit board 38. Additional support for the printed circuit board 38 is provided by support blocks 76 provided along the interior peripheral edge of the bottom cover 70.

When the printed circuit board 38 is installed in the bottom cover 70, additional support for the connector 42 is provided by a flat, angled section 78 of the bottom cover 70 established in correspondence with a lower surface of the connector 42. In the preferred embodiment, the angled section 78 is found at an external angle of about 150 degrees from the plane of the surface 46. Within normal engineering and manufacturing tolerances, the surface 78 is provided in unstressed light contact with the corresponding surface of the connector 42 to provide substantial vertical support of the connector upon application of a stress force. The surface 78 also provides a rotational resistance against the torque force created when the connector 42 is inserted into the connector receptacle of the phone 10. Additional rotational resistance is provided by support stubs 80 that extend vertically from the surface 78 along an end wall of the bottom cover 70 and lightly contact, again within normal engineering and manufacturing tolerances, a corresponding rear surface of the connector 42. The planar contact surfaces of the vertical support stubs 80 permits a slight amount of both vertical and lateral displacement of the connector 42 so as to accommodate, yet specifically limit dynamic insertion forces applied to the connector 42.

Furthermore, while the inside cover 54 and bottom cover 70 are preferably formed of a relatively stiff, high impact resistance polycarbonate material, the body of the connector 42 is preferably formed of a relatively more flexible polycarbonate material. Consequently, the relatively flexible connector body material, and the support provided by the flat angled section 78 and vertical support stubs 80 substantially relieves applied forces due to the insertion of the connector in the receptacle of the phone 10 from being applied as sheer or stress forces to the contact leads of the connector 42 at the printed circuit board 38. Preferably, the cover 54, 70 is made from a NORYL brand polyphenylene oxide material available from General Electric Plastics division of General Electric, Inc. The connector body is preferably made from a Valox brand glass-filled polyester material also available from General Electric Plastics.

Finally, additional features of the bottom cover 70 include a preferably cylindrical power port 84 and a data connection port 86. These ports, 84, 86 are preferably provided so as to readily admit the placement of conventional barrel type electrical connectors on the circuit board 38 in opposition to the cylindrical openings in the bottom cover 70.

Referring now to FIG. 4, a detailed view of the coupling of the connector 42 to the printed circuit board 38 is shown. In the preferred embodiment of the present invention, a recess 90 into the end edge 92 of the printed circuit board 38 is provided to mechanically receive a corresponding portion 94 of the connector body 42. The recess 90 is preferably less than the full width of the body of the connector 42 and further, corresponding lateral recesses are provided in the body of the connector 42, as illustrated. Each connector recess is defined by an upper surface having a forward ramped edge 96 and lower surface formed by a body extension 98. Thus, the connector recesses formed on opposite sides of the connector body 42, corresponding to the lateral edges of the recess 90, will provide significant support for the connector body 42 when engaged with the recess edges of the printed circuit board 38 in all three dimensions relative to the printed circuit board 38.

The ramped surface 96 is preferably provided as an aid in assembling the connector 42 to the printed circuit 38. As shown, contact fingers 100 extend from the connector body 42 just above the printed circuit board insertion portion 94, thereby permitting surface mount connection of the conductors 100 to the electrical circuitry present on the top surface of the printed circuit board 38. As will be appreciated, the electrical contacts 100 are provided in number and spacing to correspond with corresponding conductive fingers present within the connector receptacle present in the phone 10.

Figure 5A:
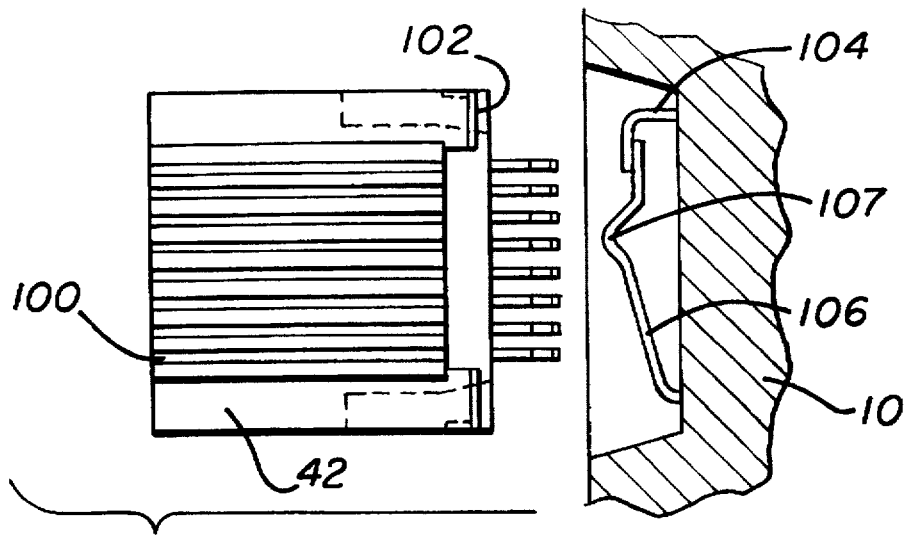
FIGS. 5a–5d provide a variety of views of the mating between the connector sub-system of the present invention and the insertion type connector receptacle of the preferred compact portable cellular telephone.
Figure 5C:
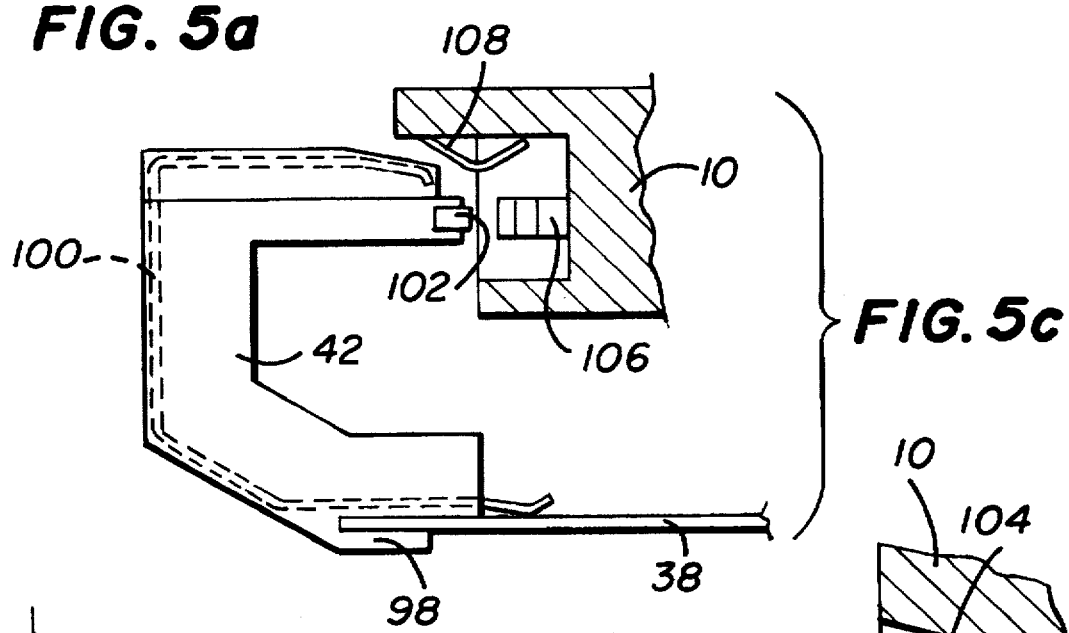
Figure 5B:
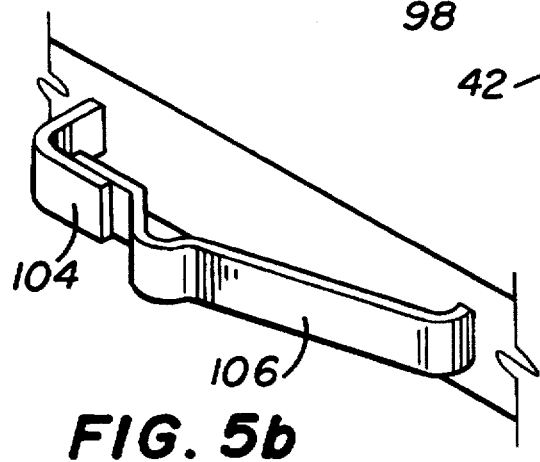

Finally, a bar 102 is preferably provided at the leading edge of the insertion portion of the connector body 42. The purpose of the bar 102 is detailed in FIG. 5. In FIG. 5a, the portion of the connector 42 that is inserted into the connector receptacle of the phone 10 is shown in top view. Within the connector receptacle is a power switch consisting of a leaf spring arrangement of a fixed contact 104 and a spring contact 106. A perspective view of these contacts are shown in FIG. 5b. As can be seen, a feature of the spring contact 106 is a contact button 107 protruded to engage the inserted portion of a conventional coupling connector and thereby break the electrical connection between the contacts 104, 106 upon connector insertion. In some models of the phone 10, the contact and spring portions 104, 106 are largely hidden between a protective plastic shield (not shown) that exposes only the button extension 107 of the spring contact 106. Conventionally, the electrical conduction path is broken so that external power to the phone 10 may be provided directly by any coupling connector as conventionally used with the phone 10.

However, for purposes of the present invention, fully portable operation of the phone 10 is maintained by providing the bar 102 in opposition to only the ends of both the fixed and spring contacts 104, 106. As shown in FIG. 5c, the bar 102 is provided in direct line with but straddling button extension 107 of the spring contact 106. Upon insertion, the signal conductors 100 engage corresponding signal contact conductors 108 provided in the connector receptacle by the phone 10 for transferring control and data signals via the conductors 100 to the printed circuit board 38.

Figure 5D:
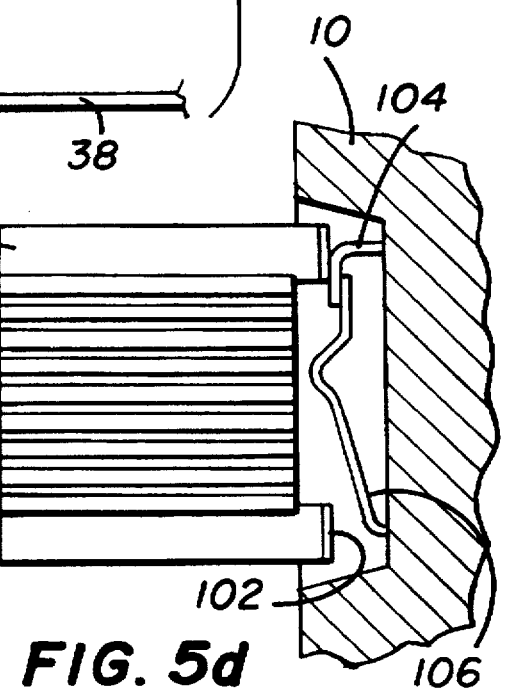

As illustrated in FIG. 5d, the electrical circuit connection between the fixed and spring contacts 104, 106 is maintained when the connector 42 is inserted fully within the connector receptacle of a phone 10. Consequently, the phone 10 remains enabled to draw power through the battery slide contacts provided on the external surface 46 of the phone 10 when mated to the contacts 60 located on the cover 54.

An alternate embodiment of the present invention is illustrated in FIG. 6. A electronics case 110, including an inside cover 112 and bottom cover 113 other than as described below, is formed consistent with the design and manufacturing considerations of the case 30. An opening 116 is provided as illustrated in a top end portion of the bottom cover 114 in opposition to the internally mounted printed circuit board 118. A conventional male microconnector 120 is preferably provided at the edge of the printed circuit board 118 so as to receive an electronics card 122 when inserted through the slot 116. Preferably, the electronics card is consistent with the design and electrical definition of a PCMCIA Type 1, Type 2, and Type 3 electronics cards. Accordingly, the mechanical and electrical definition of the connector 120 preferably corresponds to that of conventional PCMCIA connectors.

As will be appreciated, the elective provision of a PCMCIA card 22 of varying definition permits the electrical functions and features of the electronics case 110 to be fundamentally enhanced and, as a consequence, the capabilities of the phone 10 improved. For example, the electronics card 122 may provide a air-LAN interface. The cellular communication capability of the phone 10 can thus be utilized to establish a remote LAN connection in support of still physically separated computer equipment.

Alternately, the electronics card 122 may include a disk drive type medium, either implemented mechanically or through flash memory emulation. By interconnection with the electronics case 110, the cellular communication capabilities of the phone 10 may be utilized to directly store and retrieve large quantities of data in a dedicated fashion.

Other functions of the electronics card 122 include (1) a global positioning system (GPS) receiver/decoder that allows the precise location of the phone 10 to be located via a cellular radio link; (2) a multi-function modem having potentially data, facsimile and security encryption features that allows the phone 10 to operate as a cellular modem for data transferred by way of the serial port; (3) a paging system allowing the phone 10 to receive short messages and pre-dial return phone numbers; and (4) a video scanner system that allows the phone 10 to operate as a portable video source and cellular transmitter.

Figures 7A, 7B:
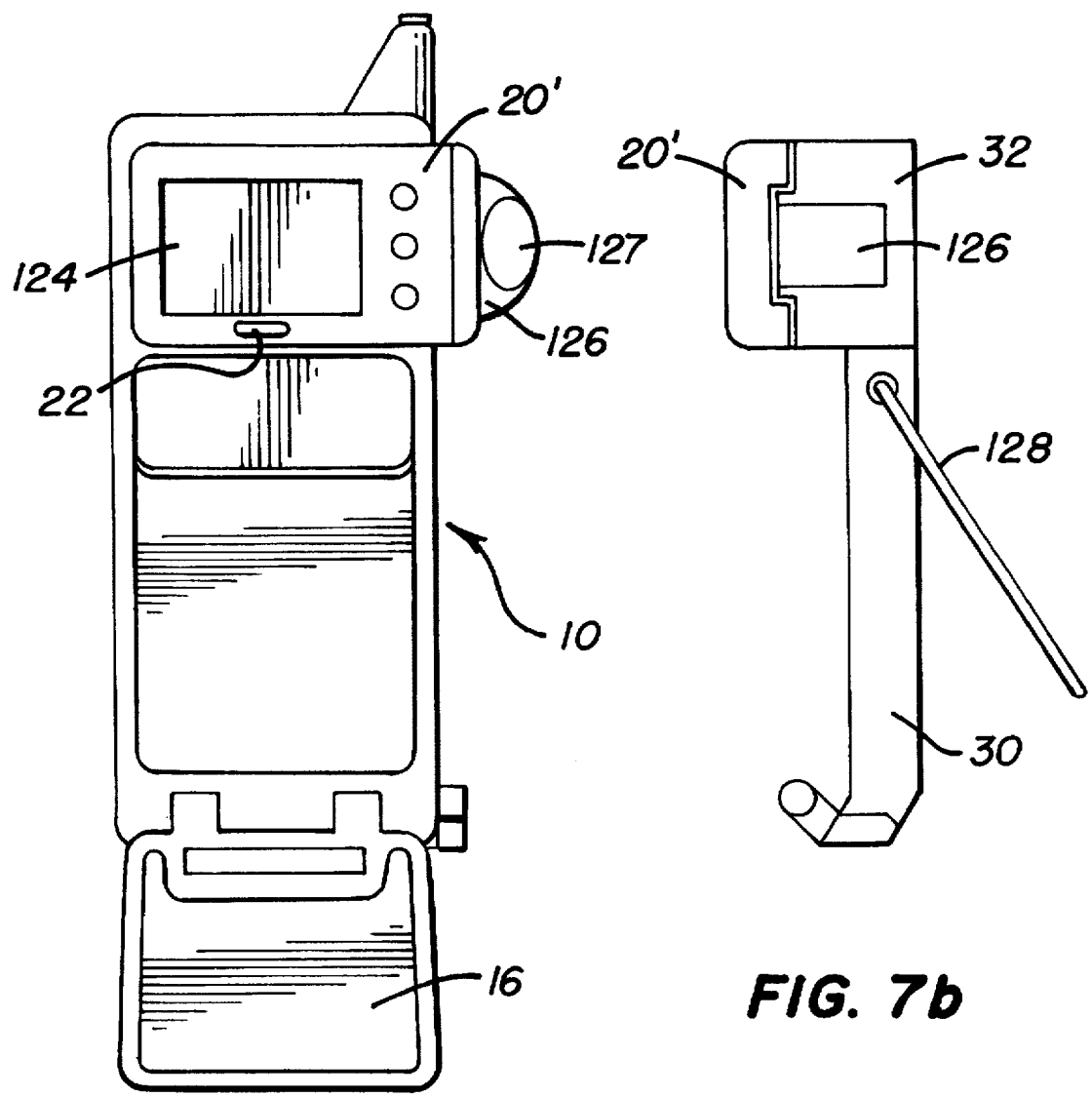
FIG. 7a–7b provides top and side views of the portable cellular telephone case of the present invention including video display and camera components and mounting stand.

Another embodiment of the present invention is illustrated in FIG. 7. The electronics case 30, and specifically the vertical arm section 32, is modified by the addition of a micro-camera 126 having a forward looking lens 127. The video signal feed and power for the camera 126 are provided by connections through the vertical arm section 32 to the flex circuit 40 or a secondary flex circuit that similarly connects to the printed circuit board 38.

The swing arm 20' is constructed substantially similar to swing arm 20, but is modified to mount an LCD screen 124 in addition to the speaker 22. Thus, with the addition of conventional video display control electronics, a complete portable cellular video-phone can be realized.

Figure 8:
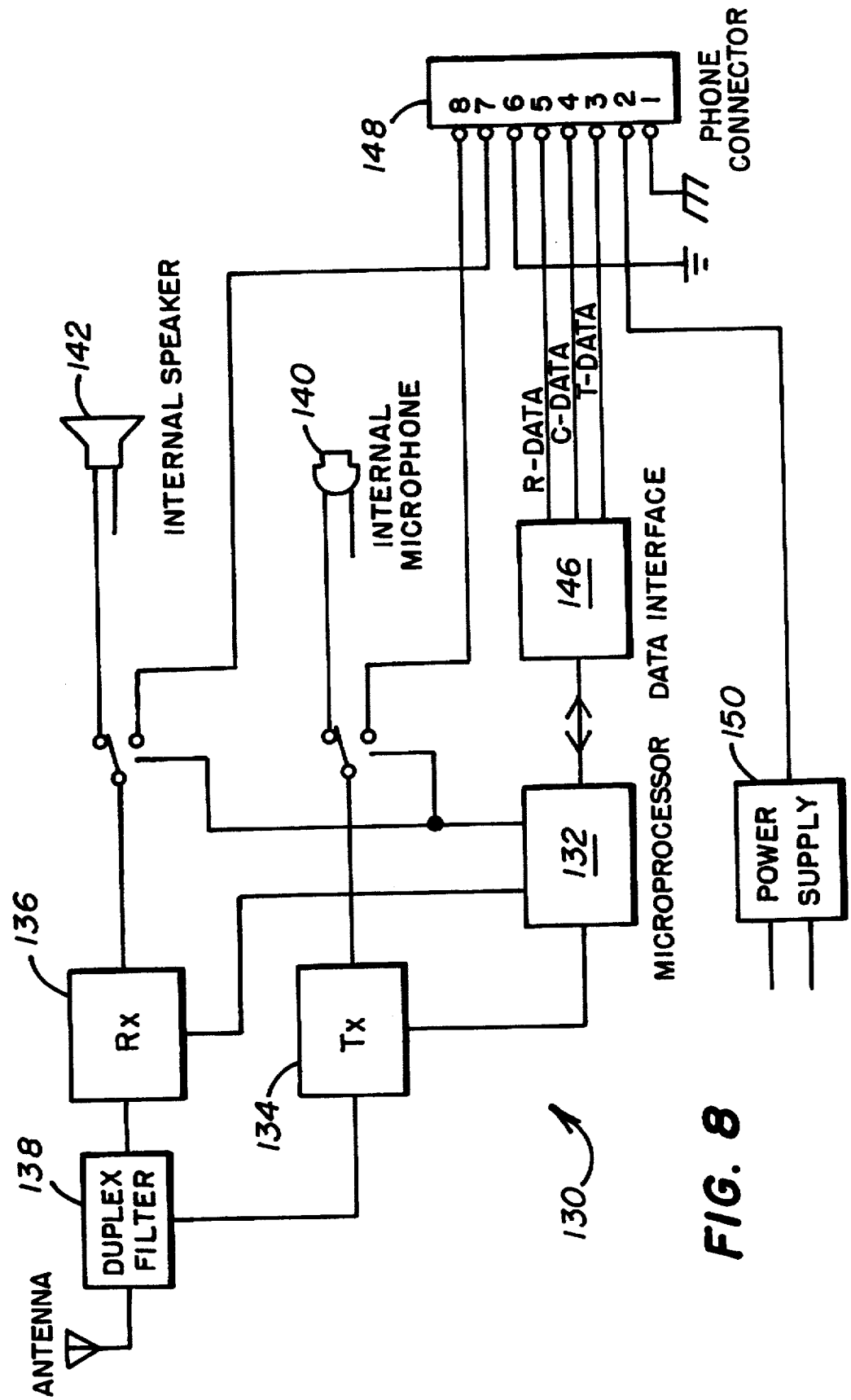
FIG. 8 provides a block schematic diagram of the compact portable cellular telephone electronics.

The electronic system 130 of the cellular phone 10 will now be described in relationship to FIG. 8. The system 130 utilizes a central microprocessor 132 to control the function of transmitter and receiver blocks 134, 136 that are coupled through a duplex filter 138 to the cellular phone antenna. The transmitter and receiver 134, 136 are also coupled through respective microprocessor controlled switches that are nominally connected to an internal microphone 140 and internal speaker 142, respectively.

A data interface block 146 is provided to receive user input through the numeric key pad of the phone 10, as well as provide for data output through the phone display. The data interface 146 also provides signal connections to a phone connector block provided in the connector receptacle of the phone 10. In the preferred embodiment of the present invention, the data interface 146 employs a three wire proprietary communications scheme by the provision of communication data on the C-data line, complementary communication data on the T-data line, and return data on the R-data line. Two additional lines provide for connection of the transmitter and receiver 134, 136 output signal lines to the phone connector 148 under microprocessor 132 control. An additional line connected between the phone connector 148 and a power supply 150 is potentially used for powering the system 130. Nominally, power is obtained via the battery slide contacts provided on the external surface 146 of the phone 10, here represented as lines 152. Significantly, the battery connection circuit formed via the lines 152 includes the fixed and spring contacts 106. Where the leaf spring contact is in an open circuit state, as occurs with use of a conventional connector, the power supply 150 must draw power via the phone connector 148. Preferably, the leaf spring contact is maintained in a closed circuit state, thereby obviating the need to provide power via the connector 42.

In order for the microprocessor 132 to determine whether to switch out the internal speaker and microphone 140, 142, the microprocessor 132 relies on the data interface 146 to determine from the state of the R-data, C-data and T-data lines whether an external connection is present. In accordance with the preferred embodiment of the present invention, the microprocessor 132 is signalled via the data interface 146 to couple the transmitter 134 and receiver 136 to the phone connector 148. This operating state is signaled by sinking approximately 90 microamperes from the C-data line, applying a nominal 5.6 volt level through a current limiting resistor to the R-data line, and applying a nominal 5.6 volt level on the pin 2 line to the power supply 150. The microprocessor 132 interprets this set of conditions as corresponding to the connection of a conventional external speaker and microphone system.

Figure 9A:
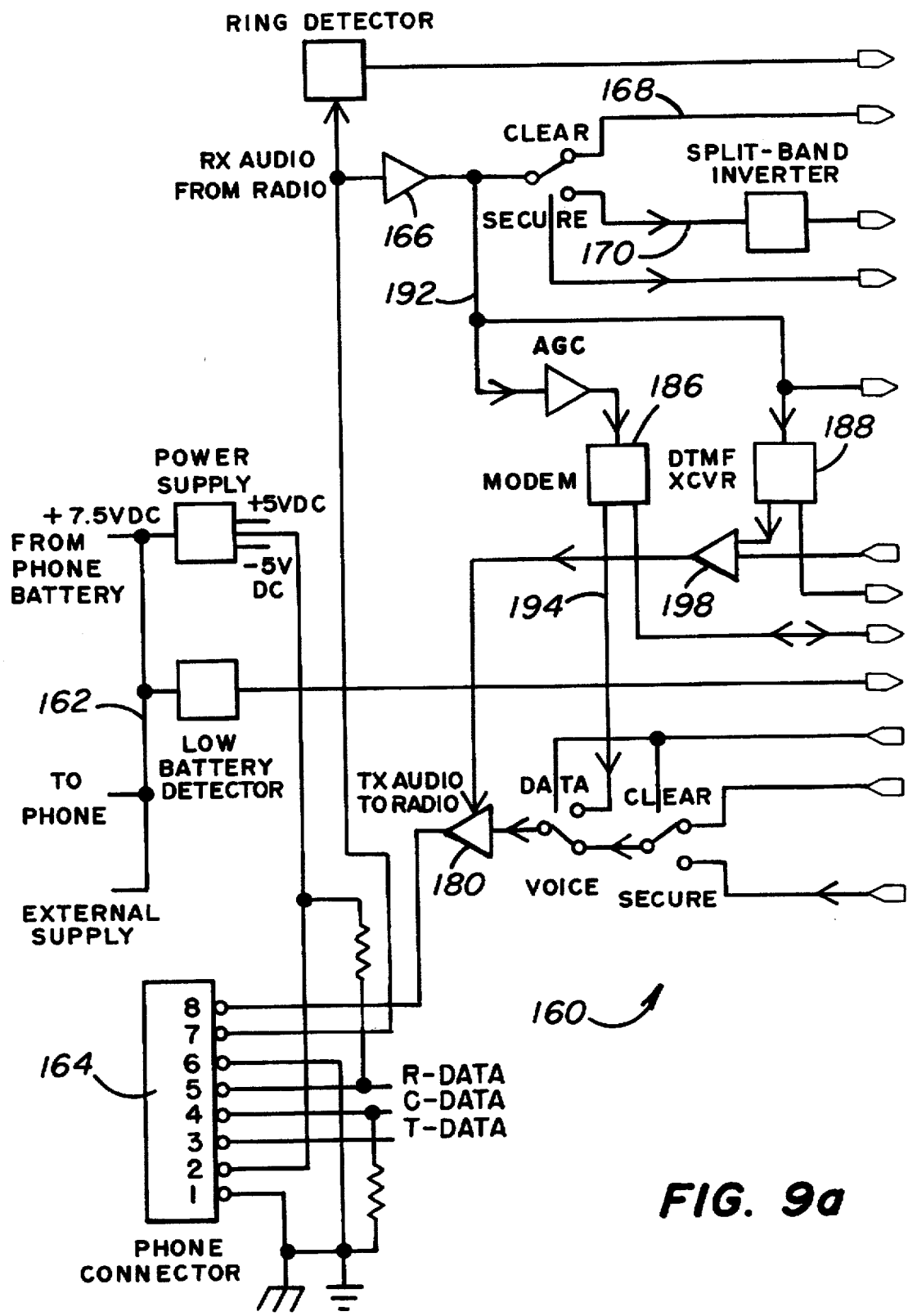
FIGS. 9a–9b provide a schematic block diagram of the preferred electronics implemented as part of the present invention to provide additional electronic functionality to the preferred compact portable cellular telephone.
Figure 9B:
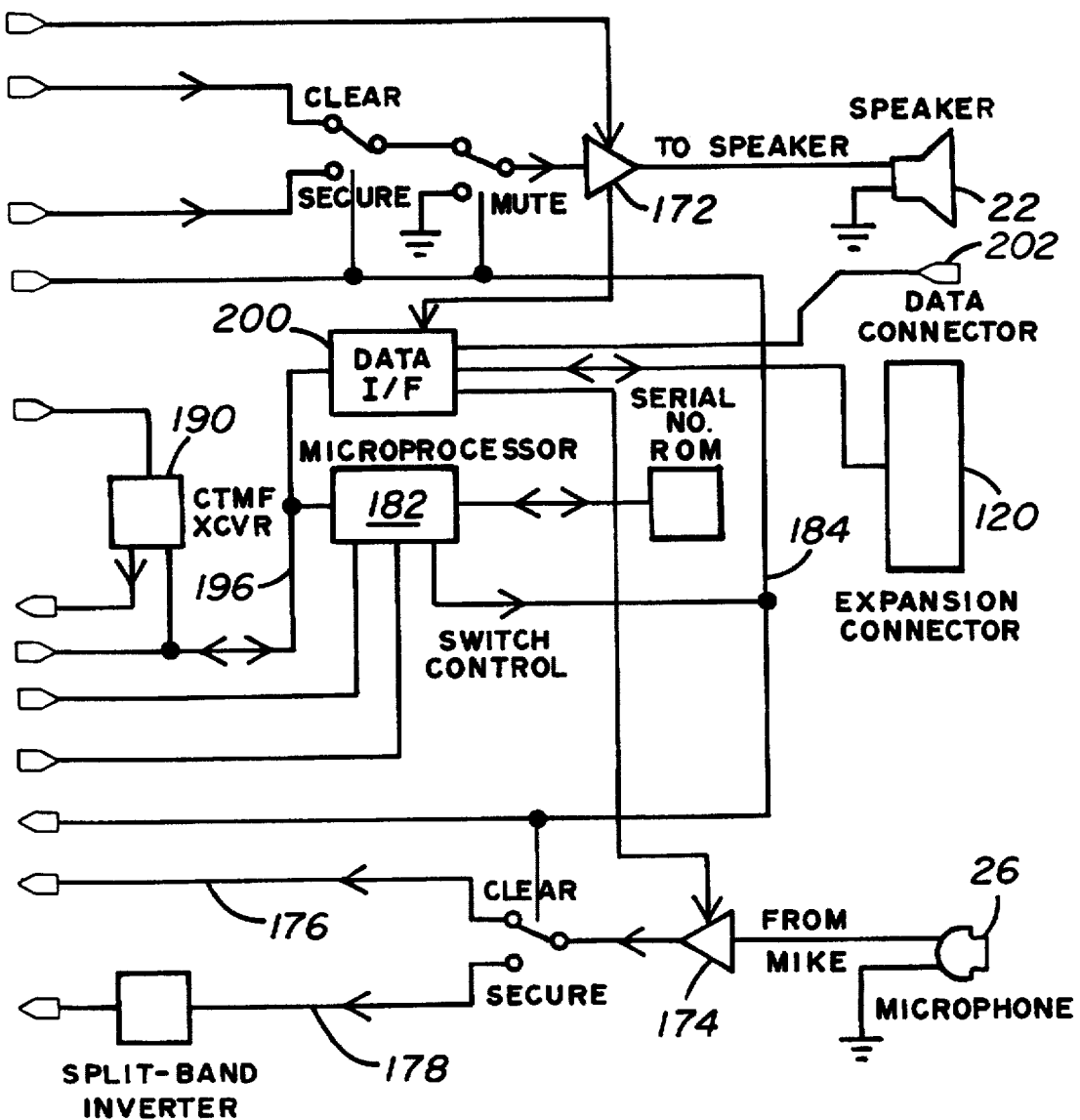

Referring now to FIGS. 9a and 9b, the preferred electronics system 160 of the present invention is shown. Power for the system 160 is drawn from the attached rechargeable battery via slide contacts 82 onto an internal power bus 162 that connects to the slide contacts 60, to provide power to the phone 10, and to the external supply connector accessible via the power port 84. A resister pull-up connection is provided from the power supply to the R-data line while a resister pull-down connection is established between the C-data line and the phone connector ground potential. Consequently, when the phone connector 164 is physically mated with the connector 148, the cellular phone system 130 routes the analog transmitter and receiver data through the connectors 148, 164.

Receiver data is routed through an amplifier 166, through either a clear or secure data path 168,170 and through an output amplifier 172 to the speaker 22 supported by the swing arm 20. Similarly, a signal originated from the microphone 26 is initially amplified by an amplifier 174 and directed through either a clear or secure data path 176, 178 to an output amplifier 180. The resultant signal is connected through the connectors 148, 164 to the transmitter 134 of the phone electronics system 130.

Selection of either a clear or secure data path is controlled by operation of a microprocessor 182 via control lines 184. The microprocessor 182 also has control and data access to a number of permanently resident signal processing function blocks. These function blocks include a modem 186, a DTMF transceiver 188, and an CTMF transceiver 190. The modem 186 may be, as in the preferred embodiment of the present invention, a conventional low speed modem circuit capable of obtaining digital data from the received analog data stream and for converting digital data to an analog signal stream on line 194. The modem 186 is connected to the microprocessor 182 by way of the microprocessor bus 196. The DTMF and CTMF transceivers 188, 190 are also coupled to the microprocessor bus 196. Both also receive input analog data for decoding into digital corresponding values and for generating analog tone values based on digital inputs. The CTMF transceiver 190 differs from the conventional DTMF transceiver 188, in the preferred embodiment of the present invention, in that the CTMF transceiver 190 operates from a different base clock frequency so that any generated or received audio tones do not interfere with the conventional DTMF tone set. Analog output signals from the DTMF and CTMF transceivers 188, 190 are provided to the output amplifier 180 by way of a summing amplifier 198.

A data interface circuit 200 is also preferably provided, at least in an alternate embodiment of the present invention, as a programmable peripheral to the microprocessor 182. Control and data provided by way of the microprocessor bus 196 is utilized to configure the data interface 200 to provide digital and analog signal connections, as appropriate, between the expansion connection 120 and microprocessor 182. The data interface 200 also provides analog or multiple bit serial digital data connections to a data connector 202 accessible by way of the data port 86. The data interface 200 also preferably receives analog data from the output amplifier 172 and may provide analog data to the input amplifier 174. Thus, the data connector 202 may be used support an external analog microphone and speaker, for example. The data connector 202 may also provide a direct RS-232 type digital data connection that allows the microprocessor 182 to exchange data with an external unit, such as a host computer.

In such an alternate preferred embodiment of the present invention, the data interface is constructed as a mixed digital and analog switching circuit providing microprocessor controlled routing of analog and digital data between the expansion connector 120, the data connector 202 and the remainder of the electronic system 160. In addition, the data interface 200 may permanently include any of the peripheral functions that could be added by way of the expansion connector 120. The interface 200 may preferably include circuitry to support compatibility upgrades for cellular telephone equipment not available when the phone 10 was originally manufactured. For example, circuitry to support new fraud-free cellular communications protocols may be added to the interface 200 and automatically used within cellular nets that support the new protocols.

Thus, an integrated extension electronics system packaged in a physically conformant case system has been described. The case system provides for a robust and reliable yet convenient, portable and physically unitary compact portable cellular phone system. The case supported electronics provide a substantial functional extension of the existing cellular phone electronics that may be readily supplemented through the addition of removable electronics cards.

As will be readily appreciated by those of skill in the art based on the foregoing disclosure of the preferred embodiments of the present invention, many modifications and variations of the present invention are possible and contemplated in light of the present teachings. It is therefore to be understood that, within the scope of the appended claims, the invention may be practiced otherwise than as specifically described herein.

We claim:

1. Apparatus coupleable to a compact portable cellular telephone that has an external physical interface for mounting a detachable battery and an electrical interface coupled to internal communications electronics that implements a communications function for said compact portable cellular telephone, said apparatus comprising:

a) a case having an attachment surface for detachably mating with said external physical interface of said compact portable cellular telephone;

b) control electronics, provided within said case, that implements a signal processing function that can be selectively incorporated into the communications function of said compact portable cellular telephone;

c) a connector coupled to said case and said control electronics matable with said electrical interface of said compact portable cellular telephone to transfer signals between said control electronics and said communications electronics of said compact portable cellular telephone; and d) a speaker unit, coupled to said case and said control electronics, that is positionable over an external surface of said compact portable cellular telephone permit detachable mating of said case with said compact portable cellular telephone.

2. The apparatus of claim 1 wherein said signal processing function of said control electronics provides for the transform of data between a first format and a second format, said control electronics being coupled to said connector to permit the transfer of said signals representing data in said first and second formats, between said control electronics and said compact portable cellular telephone.

3. The apparatus of claim 2 wherein said case further includes an arm coupled to said case and extendable over said external surface of said compact portable cellular telephone separate from said external physical interface of said compact portable cellular telephone, said arm including an electrical component coupled to said control electronics.

4. The apparatus of claim 3 wherein said arm includes an arm extension that provides for the positioning of said electrical component near said external surface where said external surface is opposite said physical interface of said compact portable cellular phone.

5. The apparatus of claim 4 wherein said case includes a battery mounting surface that permits said detachable battery to be detachably mated to said case to permit formation of a physically integral unit with said case and said compact portable cellular telephone.

6. The apparatus of claim 5 wherein said electrical component includes said speaker unit.

7. The apparatus of claim 6 wherein said case further includes first and second power connectors, said first power connector being positioned on said attachment surface and said second power connector being positioned on said battery mounting surface, said first and second power connectors being coupled to said control electronics to conduct electrical power to said control electronics and said compact portable cellular telephone.

8. Apparatus coupleable to a compact portable cellular telephone having an external surface and including circuitry to transmit and receive a radio signal, said apparatus comprising:

a) a case conformably matable with said external surface, said case including circuitry for performing a first predetermined signal processing function;

b) a speaker element capable of reproducing an output signal, wherein said speaker element is coupled to said case and is positionable with respect to said compact portable cellular telephone to permit operation as the ear-piece of said compact portable cellular telephone;

c) a first interface attached to said case for coupling the circuitry of said case and the circuitry of said compact portable cellular telephone to permit a first signal, corresponding to said output signal, to be passed between said case and said compact portable cellular telephone; and d) a second interface coupled to the circuitry of said case, said second interface permitting circuitry provided on an electronics card to perform a second predetermined signal processing function to be coupled through said case to extend said first predetermined signal processing function.

9. The apparatus of claim 8 wherein said second interface is compliant with a PCMCIA electronics card interface.

10. The apparatus of claim 8 wherein said second interface provides mechanical support for said electronics card.

11. The apparatus of claim 8 wherein said second interface is positioned with respect to said case to permit said speaker element to be concurrently operated as the ear-piece of said compact portable cellular phone.

12. The apparatus of claim 8 further comprising a microphone element capable of providing an input signal, wherein said microphone element is coupled to said case and positionable with respect to said compact portable cellular telephone to permit operation as the mouthpiece of said compact portable cellular telephone.

13. The apparatus of claim 8 wherein said first interface is enclosed between said compact portable cellular telephone and said case when said case is conformably mated with said external surface.

14. The apparatus of claim 13 wherein said case and said compact portable cellular telephone form an integral unit operable as said compact portable cellular telephone and as said compact portable cellular telephone augmented by performance of said first signal processing function.

15. The apparatus of claim 14 wherein integral unit is further operable as said compact portable cellular telephone augmented by performance of said first and second signal processing functions.

16. Apparatus coupleable to a compact portable cellular telephone that has an external physical interface, permitting the mounting of a detachable battery, and an external electrical interface coupled to internal communications electronics that implements a communications function for said compact portable cellular telephone, said apparatus comprising:

a) a case having an attachment surface for detachably mounting to said external physical interface of said compact portable cellular telephone and including a connector coupled to said case and connectable to said external electrical interface;

b) control electronics, provided within said case and coupled to said connector to provide for the transfer of signals between said control electronics and said communications electronics of said compact portable cellular telephone such that said control electronics can be selectively incorporated into the communications function of said compact portable cellular telephone;

c) an electronic card interface, coupled to said case and said control electronics, that permits the removable electrical connection of an electronic card, including card electronics, with said control electronics to enhance the capabilities of said control electronics; and d) a transducer element that provides for the production of a signal that is modified from a first form to a second form by said control electronics in connection with the enhancement of said communications function said transducer element being positionable over an external surface of said compact portable cellular telephone consistent with the detachability of said case from said compact portable cellular telephone and the use of said compact portable cellular telephone in combination with said case in performing said communications function.

17. The apparatus of claim 16 wherein said electronic card interface provides for the enhancement of said communications function.

18. The apparatus of claim 16 wherein said electronic card interface permits any of a plurality of said electronic cards to be coupled to said control electronics.

19. The apparatus of claim 16, 17, or 18 wherein modification of said signal from said first form to said second form is dependant on the operation of said card electronics in connection with said control electronics.

20. The apparatus of claim 16, 17, or 18 wherein said case includes an alternate external physical interface that permits the mounting of said detachable battery to said case and wherein the combination of said compact portable cellular telephone, said case, said battery, and said electronics card forms an integral unit consistent with the portability and use of said compact portable cellular telephone.

21. The apparatus of claim 20 wherein said case further includes a data connector, coupled to said control electronics, that permits a directly connected external device to exchange data with said control electronics and selectively said communications electronics.

* * * * *